United States Patent [19]

Rosaen

[11] 4,419,240
[45] Dec. 6, 1983

[54] FLUID FILTERING DEVICE

[76] Inventor: Borje O. Rosaen, 4031 Thornoaks, Ann Arbor, Mich. 48104

[21] Appl. No.: 403,343

[22] Filed: Jul. 30, 1982

[51] Int. Cl.³ ............................................. B01D 29/10
[52] U.S. Cl. ................................... 210/444; 210/450; 210/452; 210/453; 210/470; 210/474; 210/477
[58] Field of Search ............... 210/440, 441, 443, 444, 210/450, 452, 453, 470, 455, 473, 474, 477; 55/502

[56] References Cited

U.S. PATENT DOCUMENTS 1,556,913 10/1935 Capra .................................. 210/470
4,276,070 6/1981 Hug ....................................... 55/502

Primary Examiner—Frank Sever
Attorney, Agent, or Firm—Gifford, VanOphem, Sheridan & Sprinkle

[57] ABSTRACT

A fluid filtering device comprising a housing having an interior chamber with an open top and an inlet and outlet open to the chamber. An annular seat is secured to the housing within the chamber in a position spaced downwardly from the open top so that the seat protrudes inwardly into the chamber and forms an axially extending surface having a seal member. A filter element is removably insertable into the chamber through its open top and to a filtering position in which the filter element is positioned in between the housing inlet and outlet. The filter element includes an outwardly flanged portion which abuts against the top of the seat when the filter element is in its filtering position while the seal member sealingly engages an axially extending surface of the filter element. A cover is detachably secured across the open top of a housing while an elongated handle is secured at one end to the filter element and its other end is positioned adjacent the intersection of the cover with the housing. The handle facilitates both the insertion and removal of the filter element from the housiong chamber and, in addition, secures the filter element against any loss of seal with respect to the housing during operation of the filtering device.

6 Claims, 4 Drawing Figures

U.S. Patent Dec. 6, 1983 4,419,240
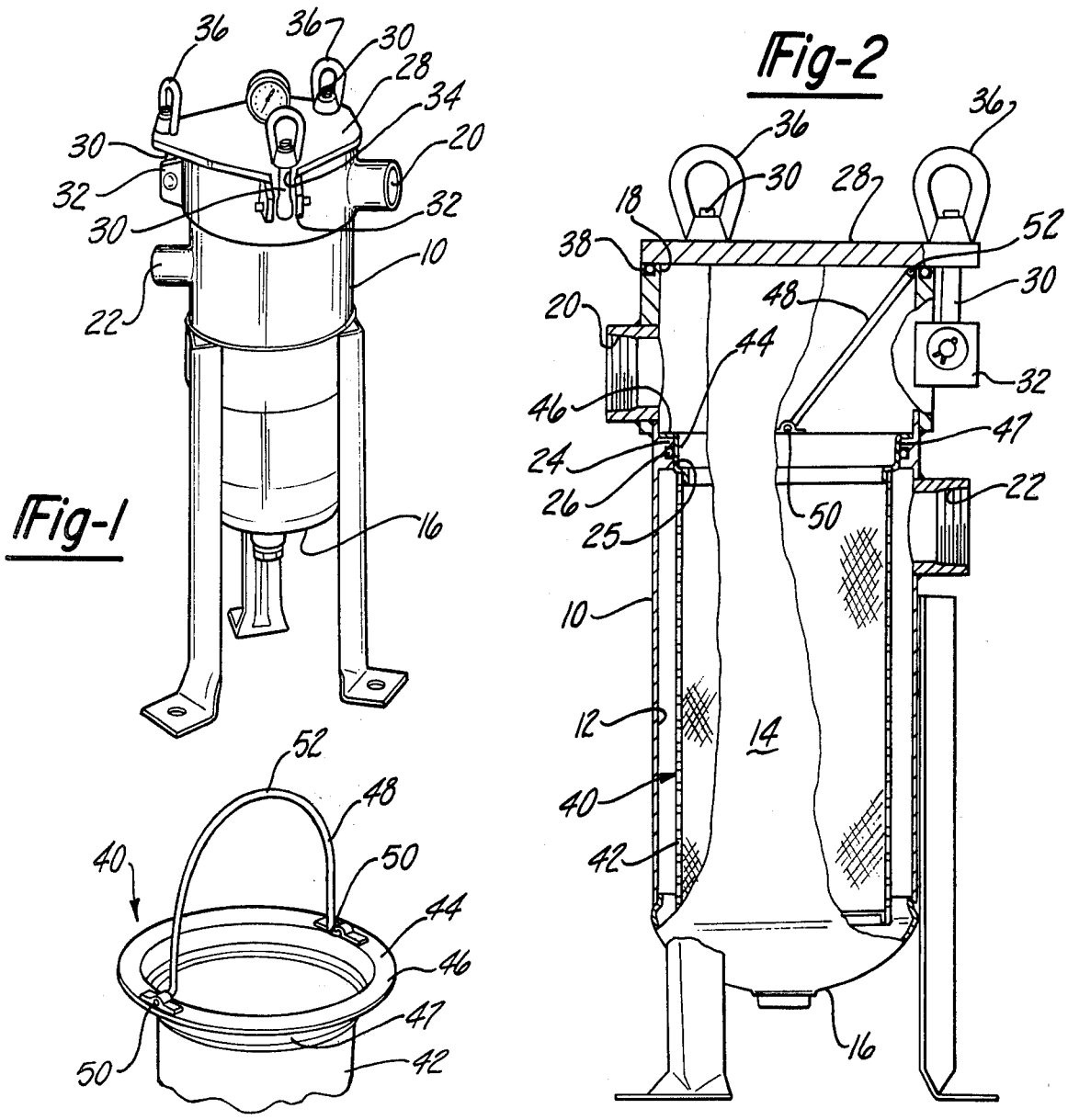

FLUID FILTERING DEVICE

BACKGROUND OF THE INVENTION

I. Field of the Invention

The present invention relates generally to fluid filtering devices and, more particularly, to a fluid filtering device with a removable filter element.

II. Description of the Prior Art

There are a number of previously known fluid filtering devices having a housing which defines an interior chamber and having both an inlet and an outlet open to the chamber. In addition, these previously known fluid filtering devices having included an open top so that a filter element is insertable through the open top of the housing and to a filtering position within the interior chamber. In its filtering position, the filter element is fluidly positioned between the housing inlet and the outlet. In addition, the filter element typically includes an outwardly extending radial flange which abuts against a seal in the housing to seal the filter element and housing together.

For high flow filtering devices, however, it is necessary to secure the filter element to the housing against tippage. Even slight tippage of the filter element permits leakage around the filter element so that unfiltered fluid enters the effluent from the device.

The previously known devices to hold the filter element in position have not been wholly effective in operation and have also been relatively expensive to manufacture since relatively accurately tolerances must be maintained. Furthermore, a number of these previously known devices have prevented the use of a filter insert or liner within the filter element when dual filtering of the fluid is required.

SUMMARY OF THE PRESENT INVENTION

The present invention provides a fluid filtering device which overcomes the above mentioned disadvantages of the previously known devices.

In brief, the fluid filtering device of the present invention comprises an elongated housing having an interior chamber and an inlet and outlet open to the chamber. The housing is also open at its top and an annular seat having an axially extending surface with a seal is secured to the housing within its chamber at a position spaced downwardly from its open top. Preferably, the housing is cylindrical in shape.

A filter element having an outwardly flanged portion at one end and a cylindrical surface extending axially downwardly from the flanged portion is insertable through the open top of the housing and to a filtering position. In its filtering position, the outwardly flanged portion of the filter element abuts against the top of the seat which limits the downward insertion of the filter element into the chamber. Simultaneously, the seal engages the cylindrical surface of the filter element and seals the filter element to the housing. When the filter element in its filtering position, the filter element is fluidly positioned between the housing inlet and the housing outlet so that the influent must pass through the filter element before passing through the housing outlet.

An elongated handle is pivotally secured to the flanged end of the filter element to facilitate both the insertion and removal of the filter element to and from the housing chamber. This handle, furthermore, is dimensioned so that, with the filter element in the filtering position, the handle abuts against the side of the housing adjacent its open top.

A cover is detachably secured to and closes the open top of the housing. Thus, with the filter element in its filtering position and the cover secured to the housing, the handle braces the filter element flange against the housing seat to prevent severe tippage of the filter element during operation of the filter device. Since the seal engages an axially extending surface on the filter element, however, slight tippage of the filter element will not break the fluid seal. The handle also enables a filter liner to be removably inserted into the interior of the filter element where dual filtering of the fluid is desired.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is an elevational view of a preferred embodiment of the invention;

FIG. 2 is a longitudinal partial sectional view showing the preferred embodiment of the filter device of the present invention;

FIG. 3 is a fragmentary elevational view showing a portion of the preferred embodiment of the invention; and FIG. 4 is a fragmentary sectional view illustrating a modification of the preferred embodiment of the invention.

DETAILED DESCRIPTION OF PREFERRED EMBODIMENTS OF THE PRESENT INVENTION

With reference first to FIGS. 1 and 2, a preferred embodiment of the filter device according to the present invention is thereshown and comprises an elongated housing 10 having a cylindrical interior wall 21 which defines an interior and generally cylindrical chamber 14. The housing is closed as its lower end 16 but is open at its top 18.

A fluid inlet 20 extends outwardly from the housing 10 and is open to the interior chamber 14. Similarly, a fluid outlet 22 is open to tht housing chamber 14 and extends outwardly from the housing. As best shown in FIG. 2, both the fluid inlet 20 and outlet 22 extend substantially radially outwardly from the housing 10 while the fluid inlet 20 is positioned axially above the fluid outle 22. The fluid inlet 20 and inlet 22 are conventional in construction and may assume other configurations and positions along the housing 10 without deviation from the spirit or scope of the invention.

With reference now to FIG. 2, an annular seat 24 having an axially extending surface 25 is either secured to or formed as a part of the housing 10. The seat 24 protrudes radially inwardly into the housing chamber 14 at a position in between the housing inlet 20 and outlet 22. The seat 24 carries a conventional fluid seal 26, such as an O-ring, along and preferably at the midpoint of its axially extending surface 25.

A cover 28 is detachably secured across the open upper end 18 of the housing 10. Although any conventional means may be used to secure the cover 28 to the housing 10, as shown in the drawing, three circumferentially spaced bolts 30 are pivotally secured at one end to mounting brackets 32 secured to the exterior of the housing 10. The bolts 30 are pivotal through receiving slots 34 (FIG. 1) formed in the cover 28. Nuts 36 then threadedly engage the bolts 30 so, that upon tightening, the nuts 36 secure the cover 28 to the housing 10. A seal 38 (FIG. 2) carried around the open top of the housing 10 fluidly seal the cover 28 to the housing 10.

Referring now to FIGS. 2 and 3, with the cover 28 removed from the housing 10, a filter element 40 is insertable through the open top 18 of the housing 10 and into the housing chamber 14. The filter element 40 includes a tubular and cylindrical filter media 42 and an annular mounting member 44 secured to one end of the media 42. The mounting member 44 includes an outwardly extending flange 46 and a cylindrical outer surface 47 which extends axially downwardly from the flange 46. When the filter element 40 is inserted into a filtering position, the flange 46 abuts against the radially extending top surface of the seat 24 (FIG. 2) and, simultaneously, the fluid seal 26 sealingly engages the cylindrical surface 47 of the mounting member 44. In doing so, the filter media 42 is fluidly positioned in between the inlet 20 and outlet 22.

Still referring to FIGS. 2 and 3, a generally U-shaped handle 48 is pivotally secured at its free ends 50 to diametrically opposed positions on the mounting member 44. The handle 48 facilitates both the insertion of the filter element 40 into the housing chamber 14 and the removal of the filter element 40 from the housing chamber 14.

In addition, the handle 48 is dimensioned so that, with the filter element 40 in its filtering position, the top 52 of the handle 48 abuts against the interior wall 12 of the housing 10 adjacent the open top 18 of the housing 10 (FIG. 2). Consequently, with the cover 28 secured to the housing 10, the top 52 of the handle 48 is positioned closely adjacent the intersection of the cover 28 with the housing 10. In doing so, the handle 48 braces the flange 46 against the seat 24 and prevents or minimizes tippage of the filter element 40 during operation of the filter device. Preferably, the handle 48 is dimensioned so that the top 52 engages the housing wall 12 at a position spaced 90° from the pivotal connection between the free ends 50 of the handle 48 and the filter element 40.

With reference now particularly to FIG. 4, for fluid filtering applications where it is desirable to have dual filtering action, a filter liner 60 having an outwardly flared portion 62 at one end is insertable through the open top 18 of the housing 10 and into the interior of the filter media 42. The outwardly flared liner portions 62 preferably includes a seal 64 which engages an inwardly extending annular abutment surface 66 on the filter element mounting member 44. Thus, when the filter liner 60 in the filtering position, the fluid flow through the filter inlet 20 passes sequentially through the liner 60, filter media 42 and out through the outlet 22.

A substantially U-shaped handle 67 is pivotally secured at its free ends 68 (only one shown) to diametrically opposed positions of the liner outwardly flared portion 64. The second handle 67 is also dimensioned so that its top 70 abuts against the side of the housing wall 14 adjacent the top 18 of the housing 10 when the line 60 is in the filtering position. Consequently, with the cover 28 secured across the top 18 of the housing 10, the cover 28 abuts against the top 70 of the second handle 67 and wedges the filter liner 60 against tippage with respect to the filter element during the operation of the filter device.

From the foregoing, it can be seen that the present invention provides an unique filter device in which the handle for the filter element serves the dual purpose of facilitating the removal and insertion of the filter element into the housing 40 as well as wedging of locking the filter element 40 against tippage during operation of the device. Furthermore, the construction of the filter element handle permits additional filter liners 60 to be used in conjunction with the filter element 40 where dual filtering action is desirable.

A further important feature of the present invention is the provision of the seal 26 which engages the axially extending surface 47 of the filter element 40 when the filter element 40 is in its filtering position. By this construction, slight tippage of the filter element 40 during operation will not break the fluid seal between the filter element 40 and the housing 10. Consequently, the handle 48 and its pivotal attachment to the filter element 40 can be inexpensively manufactured since high precision is not required.

Having described my invention, however, many modifications thereto will become apparent to those skilled in the art to which it pertains without deviation of the spirit of the invention as defined by the scope of the appended claims.

I claim:

1. For use in conjunction with a high flow liquid fluid system, a liquid fluid filtering device comprising:
    a housing having an axially extending interior chamber and an open top;
    said housing having a fluid inlet and a fluid outlet open to said chamber, said fluid inlet adapted for connection to the high flow liquid fluid system,
    a seat secured to said housing within said chamber at a position spaced downwardly from said open top, said seat protruding into said chamber and forming an axially extending inner surface,
    a filter element removably insertable into said chamber through said open top and to a filtering position in which said filter element is positioned between said inlet and said outlet, said filter element comprising a flanged portion which abuts against a top of said seat when said filter element is in said filtering position and an outer surface which extends axially outwardly from said flanged portion,
    means for preventing severe tippage of said filter element and for maintaining a fluid seal between said filter element and said housing despite slight tippage when said filter element is in said filtering position comprising:
    a seal carried at a midpoint on said axially extending inner surface of said seat, said seal engaging said filter element outer surface when said filter element is in said filtering position,
    a cover and means for detachably securing said cover to said housing so that said cover closes the open top of said housing,
    an elongated handle pivotally secured at one end to said filter element, said handle being dimensioned so that, when said filter element is in said filtering position and said cover is secured to said housing, the other end of said handle is positioned closely adjacent an intersection of said cover with said housing.

2. The invention as defined in claim 1 wherein the axis of said handle extends diagonally through a portion of said chamber when said cover is secured to said housing.

3. The invention as defined in claim 1 wherein said filter element is cylindrical in shape and when said handle is substantially U-shaped, the free ends of said handle being pivotally secured at substantially diametrically opposed positions of said filter element, and wherein, with said cover secured to said housing, the other end of said handle is positioned above said filter element at a position spaced substantially ninety degrees from the free ends of said handle.

4. The invention as defined in claim 1 and comprising a filter liner insertable through the open top of said housing and to a filtering position in the interior of said filter element 5. The invention as defined in claim 4 wherein said filter element includes an inwardly extending annular abutment surface and said liner includes an outwardly flared portion which abut against said abutment surface when said liner is in said liner filtering position.

6. The invention as defined in claim 5 and comprising a second handle secured at one end to said liner, said second handle having its other end positioned adjacent the intersection of said cover and said housing when said liner is in said filtering position.

* * * * *

UNITED STATES PATENT AND TRADEMARK OFFICE
CERTIFICATE OF CORRECTION

PATENT NO. : 4,419,240

DATED : December 6, 1983

INVENTOR(S) : Borje O. Rosaen

It is certified that error appears in the above—identified patent and that said Letters Patent is hereby corrected as shown below:

In the abstract, line 21 delete "housiong" insert --housing--.

Column 2, line 45 delete "tht" insert --the--.

Column 2, line 50 delete "outle" insert --outlet--.

Column 3, line 2 delete "threadedly" insert --threadably--.

Column 3, line 62 delete "line" insert --liner--.

Column 4, line 5 delete "of" insert --or--.

Signed and Sealed this

Twenty-fourth Day of April 1984

[SEAL]

Attest:

GERALD J. MOSSINGHOFF

Attesting Officer

Commissioner of Patents and Trademarks